United States Patent [19]

Willinger

[11] Patent Number: 4,907,772
[45] Date of Patent: Mar. 13, 1990

[54] UNIVERSAL CLAMP FOR AQUARIUM TANK

[75] Inventor: Allan H. Willinger, Oakland, N.J.

[73] Assignee: Willinger Brothers, Inc., Oakland, N.J.

[21] Appl. No.: 215,238

[22] Filed: Jul. 5, 1988

[51] Int. Cl.⁴ ............................................... A47B 96/06
[52] U.S. Cl. ................................ 248/231.7; 248/316.1
[58] Field of Search ............ 248/231.7, 231.4, 225.31, 248/229, 316.4, 316.8, 316.1; 119/5

[56] References Cited

U.S. PATENT DOCUMENTS

| | | | |
|---|---|---|---|
| 1,412,961 | 4/1922 | Periolat | 248/231.7 X |
| 2,470,439 | 5/1949 | Kohler | 249/231.7 X |
| 2,958,760 | 11/1960 | McNally | 248/231.4 X |
| 3,288,415 | 11/1966 | Eickhoff | 248/231.7 |
| 3,333,807 | 8/1967 | Locatelli | 248/231.7 |
| 3,341,909 | 9/1967 | Havener | 248/231.7 X |
| 3,424,419 | 1/1969 | Siegel | 248/231.7 X |
| 4,301,767 | 11/1981 | Willinger et al. | 119/5 |
| 4,708,183 | 11/1987 | Fiqueroa | 248/231.7 |
| 4,709,891 | 12/1987 | Barnett | 248/231.7 |

Primary Examiner—Ramon O. Ramirez
Attorney, Agent, or Firm—Helfgott & Karas

[57] ABSTRACT

An aquarium accessory for removable attachment to the top rim of an aquarium tank. The accessory includes an instrument useful for the functional or aesthetic benefit of the aquarium tank. A coupling arrangement is connected to the instrument. The coupling arrangement includes a clamping screw for securing to the rim. Coaxillay arranged with the claimping screw is a biting device positioned on the coupling means for biting into the rim upon securement by the clamping screw.

11 Claims, 3 Drawing Sheets

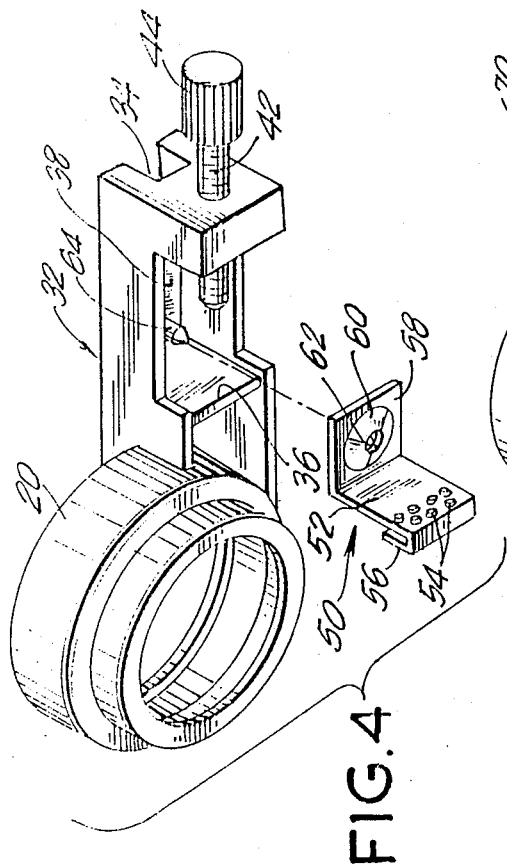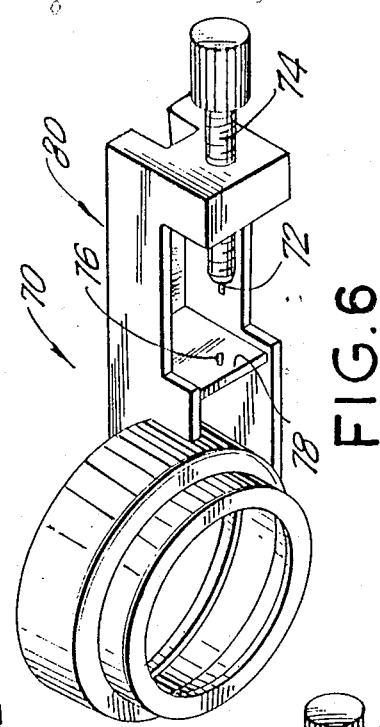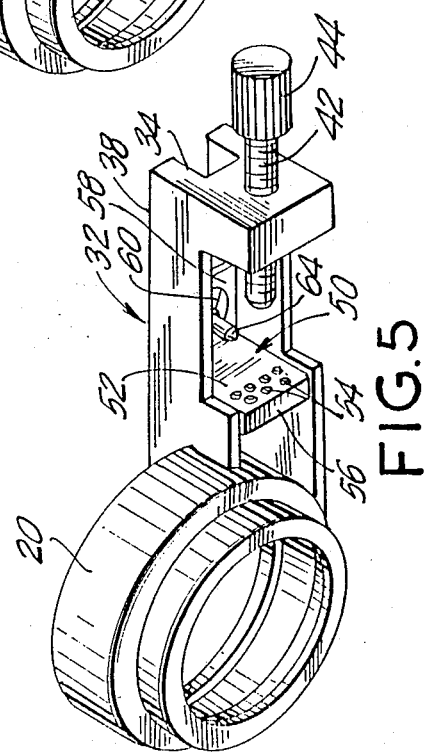

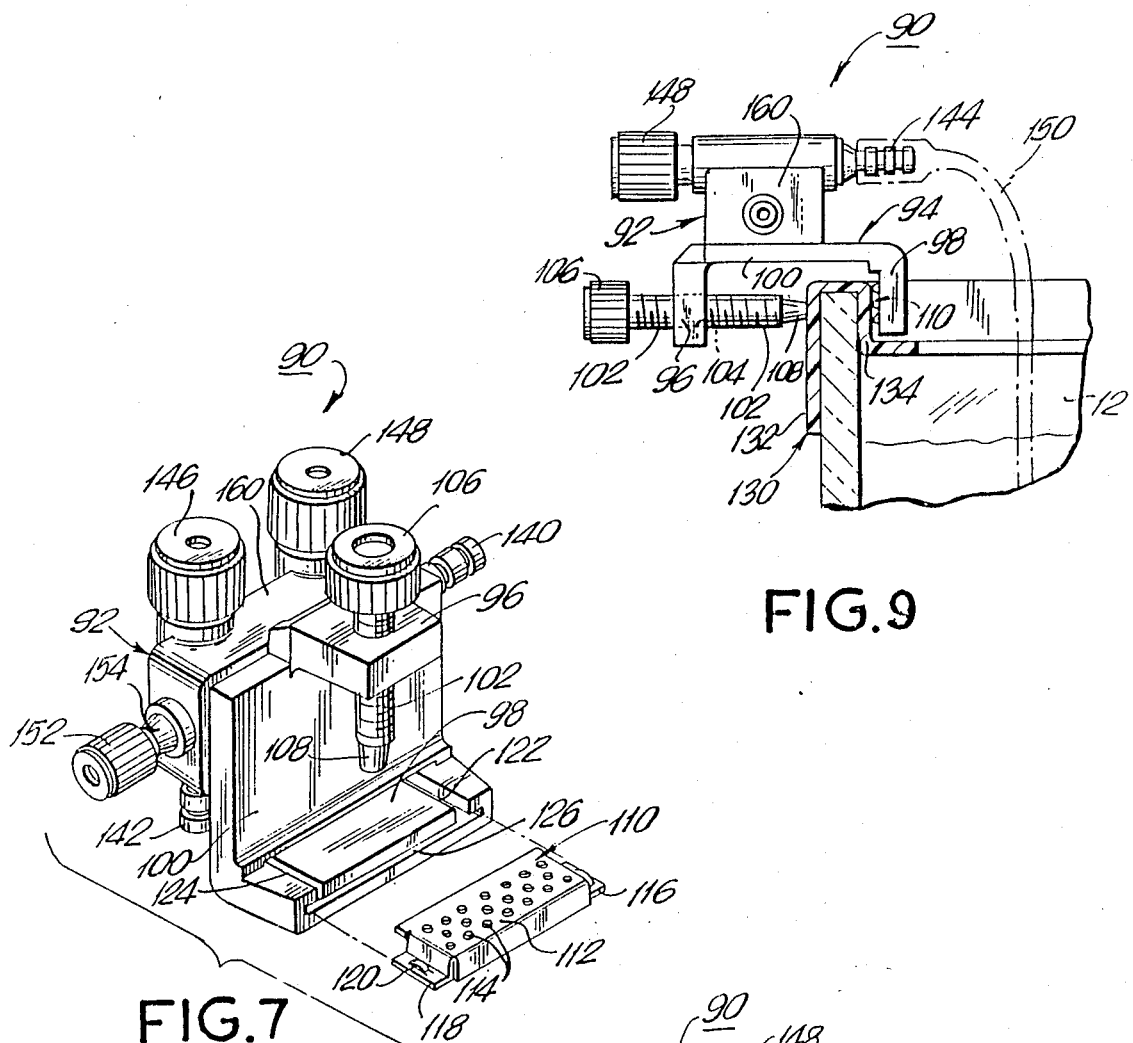
FIG.9
FIG.7
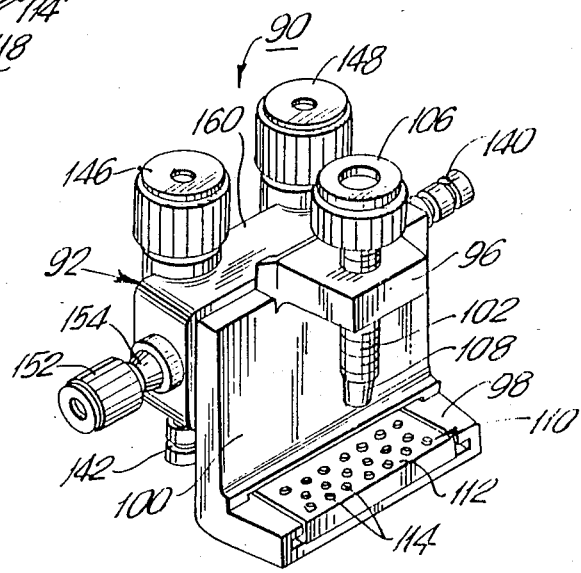
FIG.8

UNIVERSAL CLAMP FOR AQUARIUM TANK

BACKGROUND OF THE INVENTION

This invention relates to aquarium tanks, and more particularly to a clamping apparatus for connecting an aquarium accessory to the upper edge of an aquarium tank.

In using aquarium tanks, it is quite frequent to connect an aquarium accessory to the upper edge of the aquarium tank. By way of example, it is typical to connect a heater at the upper edge of the aquarium tank and have it depend downward into the aquarium tank water to provide controlled heat of the aquarium tank water. Other accessories that are frequently connected to the top of the aquarium tank include valves, such as a gang valve, platforms for holding air pumps, aquarium filters, thermometers, and other aquarium appliances. Occasionally, it may even be desirable to connect aesthetic accessories from the top of the aquarium tank and depend them into the aquarium water.

Connecting these aquarium accessories to the aquarium is made difficult by the fact that it is typical to have a rim placed on the upper edge of the aquarium tank. In most cases, aquarium tanks are substantially rectangular in shape. The walls being made of glass or plastic typically have upper edges that may be sharp. To protect the user from harming himself at the sharp upper edge of the aquarium tank, a rim is typically placed over that edge. The rim covers the edge with a substantially inverted U-shaped configuration that saddles the upper edge of the tank walls. However, the rim generally also includes an inwardly directed ledge or lip which projects inwardly towards the center of the aquarium tank.

Rims are provided by various manufacturers. While almost all of these are of the same general configuration, the dimensions with respect to the height or depth of the rim varies. Likewise, the dimensions of the ledge or lip vary from rim to rim. The rims not only differ based upon their manufacturing origin but also differ based upon the size of the rim and the size of the aquarium tank on which the rim is to fit.

Because of the wide variety of dimensions of the rim on the aquarium tank, it is difficult to design a particular aquarium accessory to universally fit on all aquarium tank rims. In most cases, the coupling arrangement for the aquarium accessory may simply be an inverted U-shaped hook that fits on the upper rim. However, because the width of the rim may vary, the mouth of the hook must be wide enough to accommodate the largest rim. This would then cause difficulties when the accessory is utilized with a narrower rim. The accessory then loosely held, it angles downwardly at an awkward and unaesthetic position, and is easily knocked off the rim. The fact that the accessory can fall into the water by falling off the upper rim may even provide a serious hazard where the accessory is an electrical appliance such as a heater, a pump, or a motor.

Other types of clamping arrangements use a screw type coupler. However, again because of the wide variation in rim dimensions, it winds up that on many rims there is inadequate height or thickness dimension for the screw to adequately grasp and provide secure connection to avoid tilting or bending of the aquarium accessory as it depends downward from the rim.

Accordingly, there is need for a coupling arrangement for interconnecting accessories to aquarium tanks which can be utilized with all types of aquarium rims and still provide secure, safe, and fixed attachment to the aquarium rim

SUMMARY OF THE INVENTION

It is accordingly an object of the present invention to provide a clamping arrangement for aquarium accessories which avoids the aforementioned problems of prior art devices.

Another object of the present invention is to provide a universal clamp which can be securely connected to the upper rim of an aquarium tank and from which can be connected an aquarium accessory for use with the aquarium tank.

Yet another object of the present invention is to provide a coupling arrangement which secures onto the upper rim of an aquarium tank by biting into the rim as the clamp is tightened to the rim.

Yet a further object of the present invention is to provide an aquarium accessory which can couple onto the upper rim of the aquarium tank and can be connected regardless of the dimensions of the rim.

Briefly, in accordance with the present invention, there is provided an aquarium accessory for removable attachment to the top rim of an aquarium tank. The accessory includes an instrument portion which provides functional or aesthetic use with the aquarium tank. The coupling arrangement for the instrument connects onto the top rim. The coupling arrangement includes a clamping device for securing to the rim. Also included is a portion which bites into the rim upon securement by the clamping device.

In an embodiment of the invention, the portion that bites into the rim includes a sharp protrusion which projects substantially perpendicular to the rim and slightly penetrates as the clamping device is tightened onto the rim.

In one embodiment of the invention, the accessory can be in the form of an aquarium heater connected to the upper rim of the aquarium tank and depending downwardly into the tank.

In another embodiment of the invention, the accessory can be a gang valve which is connected to the rim and fits onto the top of the aquarium tank. Other types of accessories can also be utilized with the accessories serving either a functional or an aesthetic purpose in connection with the aquarium tank.

The portion that bites into the rim can be a variety of items including a single sharp projection such as a pin, or an entire broad surface such as a grater surface.

The aforementioned objects, features and advantages of the invention, will, in part, be pointed out with particularity, and will, in part, become obvious from the following more detailed description of the invention, taken in conjunction with the accompanying drawings, which forms an integral part thereof.

BRIEF DESCRIPTION OF THE DRAWING

In the drawing:

FIG. 4 is an exploded perspective view of the coupling arrangement in accordance with one embodiment of the present invention;

FIG. 5 is an assembled view of the embodiment shown in FIG. 4;

FIG. 6 is a perspective view similar to that shown in FIG. 5 and showing another type of a coupling arrangement in accordance with the present invention;

FIG. 7 is a perspective exploded view of a gang valve accessory for connection to the upper rim of an aquarium tank and showing another type of coupling arrangement in accordance with the present invention;

FIG. 8 is an assembled perspective view of the device shown in FIG. 7, and

FIG. 9 is a cross-sectional view of the aquarium tank showing the gang valve of FIGS. 7 and 8 positioned on the aquarium tank.

In the various figures of the drawing like reference characters designate like parts.

DESCRIPTION OF THE PREFERRED EMBODIMENT

Figure 1:
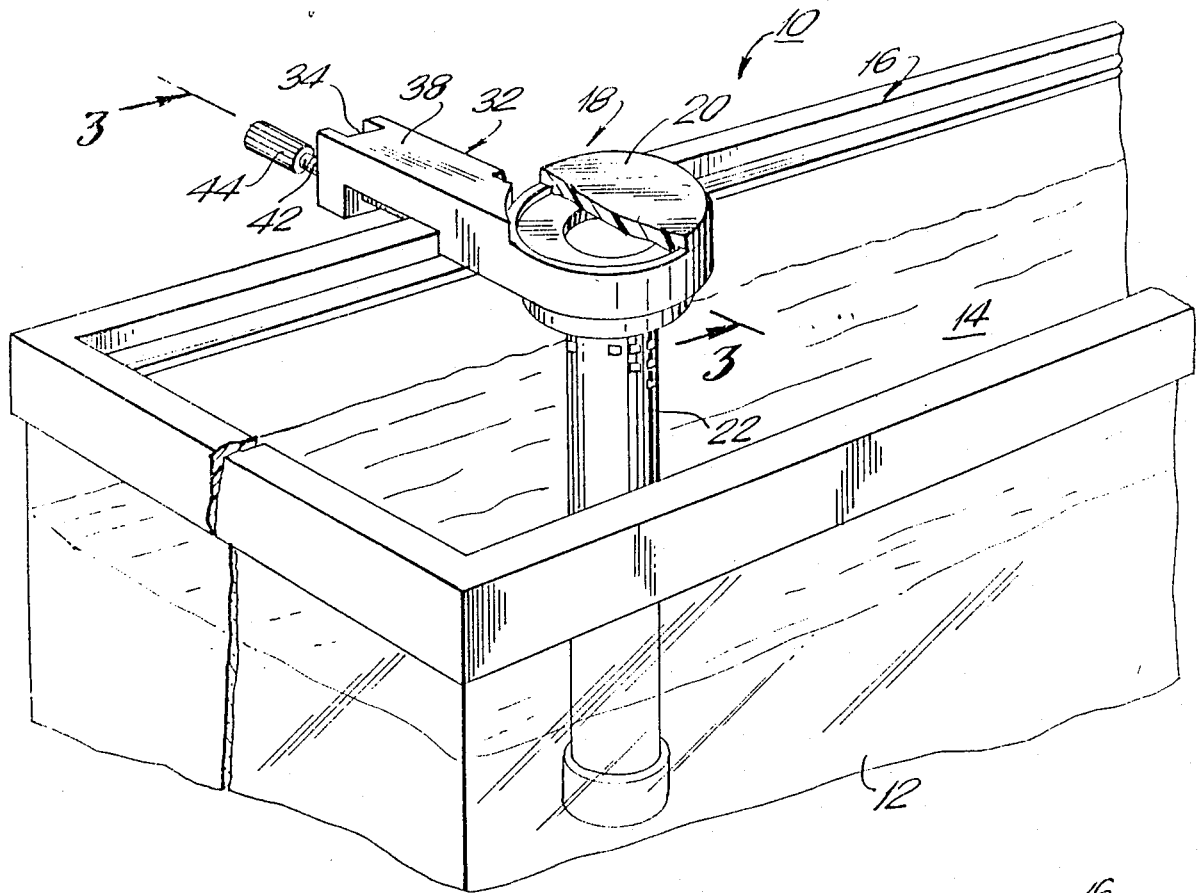
FIG. 1 is a perspective view showing an aquarium accessory in the form of a heater coupled to the upper rim of an aquarium tank and depending into the aquarium water.

Referring now to FIG. 1, there is shown an aquarium tank 10 of substantially rectangular configuration including side walls 12 and containing water 14. At the upper edge of the walls is provided a safety protection rim 16 which sits on the upper edge of the walls of the aquarium tank. Typically, various types of aquarium accessories will be connected at the top of the aquarium tank. Some of these will depend into the aquarium water while others will sit on top of the tank and yet others may be connected to the upper edge of the aquarium tank and hang outside of the aquarium tank.

By way of example, one such an aquarium accessory is shown as the heater 18 which is connected to the top of the tank. Although various types of heater devices are well known, the heater as shown includes an upper head portion 20 having a covering ring from which depends a heater element 22. Any such type of heater as is well known in the art can be utilized.

Figure 2:
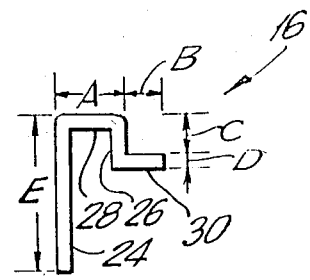
FIG. 2 is a schematic view showing the dimensions of a rim typically placed at the upper edge of the aquarium tank.

The problem of connecting the aquarium accessory, such as the heater 18, can best be understood by viewing a cross section of the upper rim 16 of the aquarium tank as is shown in FIG. 2. The typical aquarium rim is of substantially inverted U-shape configuration including a first longer leg 24 which is positioned typically on the outside of the aquarium tank. A second shorter leg 26 is positioned on the inside of the aquarium tank. These two legs are interconnected by a bridge wall 28 which sits at the top of the edge of the aquarium tank. Typically, an inwardly turned lip or ledge 30 terminates the shorter wall 26.

The various sections of the rim have different dimensions based upon the type of manufacturer as well as the size of the aquarium tank on which it is being utilized. The various dimensions are shown indicated by letters. A study of substantially all of the available rims indicate the following variational dimensions of these given sections. Specifically, the bridge wall 28 is identified by the dimension A and it has been found that such dimension varies for a typical rectangular aquarium tank between 0.261" and 0.815". For non-rectangular aquarium tanks, such dimensions have been found to vary between 0.319" and 0.712".

The extent of the ledge 30 is given by the dimension B and for rectangular aquarium tanks has been found to vary between 0.120" until 0.395". For non-rectangular aquarium tanks such dimension has been found to vary between 0.161" and 0.340".

The height of the wall 26 above the ledge 30 is designated by C and for rectangular aquarium tanks, such dimension has been found to vary between 0.128" and 0.790". For non-rectangular aquarium tanks the variation has been found to be a low of 0.188" and a high of 0.650".

The thickness of the ledge 30 is shown by the dimension D and for rectangular aquarium tanks such thickness has been found on rims to be between a dimension of 0.060" and 0.160". For non-rectangular aquarium tanks, the variation has been found between 0.069" and 0.127".

The height of the outer wall 24 is given by the dimension E. The smallest height found for rectangular aquarium tanks has been found to be 0.500" and the largest has been found to be 2.010". For non-rectangular tanks the variation has been between 0.765" and 1.617".

It is accordingly seen that the rims vary greatly in their size. Any coupling device which simply overhangs the top of the rim may not have enough clearance for the variations in the length of the ledge 30, which varies considerably from rim to rim. If enough clearance is provided for the largest ledge, then for thin ledges the accessory will bend inwardly at an angle. If the overhang is provided just enough for the shortest legs, then it will bend outwardly trying to over reach the wider ledge.

Should a sample clamping arrangement be utilized, then since the dimension C is very shallow on some rims, there would be insufficient room to grab such shallow portion and the appliance would fall off the rim. When falling off the rim, it may fall into the aquarium water causing a hazard, especially where electrical appliances are utilized.

Likewise, the variation in the dimension A causes difficulty in providing sufficient clearance for both thin as well as wide rims.

Figure 3:
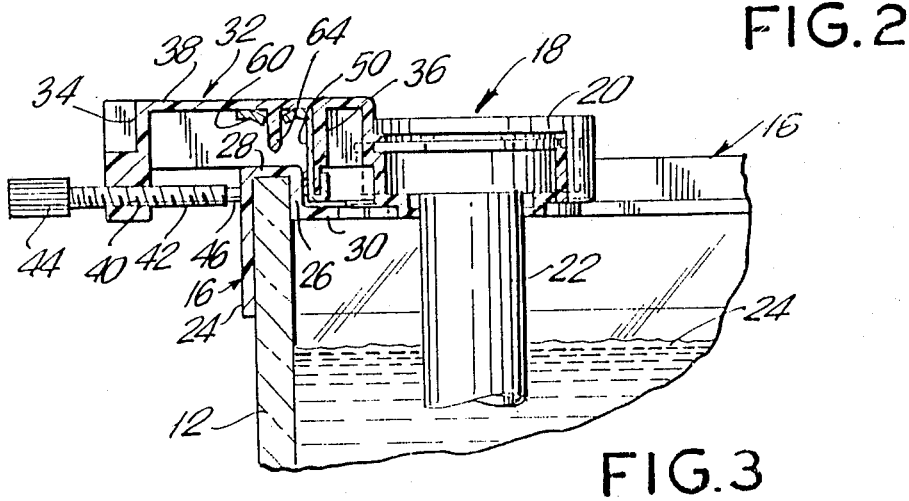
FIG. 3 is a cross-sectional view taken along lines 3—3 of FIG. 1.

As can best be seen in FIGS. 1 and 3, in the present invention, there is provided a coupling device, shown generally at 32 which serves to hold the particular type of accessory, in this case the heater 18. The coupling device 32 is shown to be a substantially U-shaped configuration having an outer wall 34, an inner wall 36, and interconnected by a top or bridge wall 38. An aperture 40 provided in the outer wall 34 is threaded and through which extends a clamping screw 42. A knurled head 44 at the outer end of the clamping screw facilitates threading of the screw. Likewise, a pointed stud 46 at the inner end provides a secure clamping onto the outer wall 24 of the rim 16.

In order to secure the clamp in place, there is provided a biting member 50. As can best be seen in FIGS. 3, 4 and 5, the biting member 50 includes a flat surface 52 from which projects a-plurality of sharp projections 54 simulating a grating surface. The biting member 50 is held in place by providing a channeled lower edge 56 which seats around the bottom of the wall 36. A flange extension 58 from the top end of the surface 52 includes a plurality of spring fingers 60 defining central aperture 62. A stud 64 downwardly depending from the bridge wall 38 of the coupling device 32 is seated into the aperture 62 and the spring fingers 60 grasp onto the stud 64 preventing downward pulling of he biting member 50. The assembled biting member 50 positioned in place is shown in FIG. 5.

As can best be seen in FIG. 3, the clamp is connected so that the biting portion, and specifically the protrusions 54 are placed on the inner wall 26 of the rim. The clamping screw 42 is threaded onto the outer wall 24 of the rim. As the clamping screw is tightened, the protrusions bite further into the rim thereby securing the clamp in place.

It should be appreciated, that even if the ledge 30 were to vary in dimension, the clamp would still be retained regardless of the length B of the ledge. Likewise, the height of the wall 24 shown by the dimension E does not come into play since the clamp will clamp at the upper edge regardless of how much the wall depends therefrom. Likewise, so long as the top wall 38 of the clamp is made sufficiently wide to accommodate the widest dimension A, it will automatically serve any smaller dimensions. Concerning the dimension C, the only requirement is that the sharp projections 54 are present at the bottom of the surface wall 52 to penetrate into whatever height C is provided. In that way, regardless of what the dimension C is, it will bite into a portion of the rim and hold the clamp in place.

It is thus noted, that the clamping device will always manage to secure the accessory in place regardless of the rim dimension. Furthermore, with an accessory of the type shown in FIG. 1 which depends downwardly, the accessory will always be held away from the ledge 30 and will depend substantially vertically downward into the water without being angularly bent.

As shown in FIG. 6, the biting projection need not be a grating surface. Specifically, in FIG. 6 there is shown a aquarium accessory holder 70 of the type shown in FIGS. 4 and 5. In this case, however, the biting portion is shown by a single pin 72 projecting from the clamping screw 74. Additionally, there is shown a second pin 76 projecting from the inner wall 78 of the inverted U-shaped arrangement of the clamp portion 80. While two pins 72, 76 are both shown, it should be appreciated that only one of these is necessary. Specifically, the pin 76 can be used alone and the clamping screw 74 utilized without its pin 72. Likewise, the pin 72 can be used at the end of the clamping screw without any pin 76 used on the inside wall. Where both pins are utilized, the pins are preferably coaxial with each other. Likewise, the pins are positioned such that they are preferably perpendicular to the rim. However, they can also be at oblique angles so long as they are able to bite into or penetrate into the wall of the rim.

It should be appreciated, that in a similar manner in FIGS. 4 and 5, the clamping screw should preferably be coaxial with the grating surface or a least with some of the sharp projections on the grating surface. This will provide a good arrangement whereby the clamp will exert a force coaxially with the presence of the sharp projections thereby assuring that the projections will bite into the rim.

Although the accessory shown in FIGS. 1-6 is of a depending heater, it should be appreciated that other types of aquarium accessories could likewise be secured in place by means of the same type of clamping arrangement. Specifically, referring to FIGS. 7, 8 and 9, there is shown a gang valve 90 having an instrument portion 92 sitting on top of the clamping portion 94. The clamping portion 94 again includes a substantially inverted U-shaped arrangement having opposing walls 96 on the outside and 98 on the inside interconnected by a bridge or top wall 100. The clamping screw 102 passes through a threaded aperture 104 in the outer wall 96 and is terminated by means of an enlarged head 106 on the outside and the stud 108 at the inner edge of the screw.

Positioned on the inside of the inner wall 98 is a biting member 110. The biting member includes a grating surface 112 which contains a plurality of individual sharp projections 114. The biting member 110 is secured in place by means of a pair of laterally directed wings 116, 118 on which are included upwardly bent tab portions 120. A pair of opposing channels 122, 124 terminating in an undercut slice 126 is provided in the wall 98. The biting member 110 can then be forced fitted into place with the wings sliding into the slit 126 and the tabs 120 locking the grating surface in place by means of a friction type engagement.

In connecting an accessory secured to the coupling means, the coupling means is placed over the rim 130. The clamping screw is tightened on to the outer wall 132 of the rim and the grating surface bites into the inner rim wall 134 to secure the coupling means in place.

The particular accessory shown is a gang valve having an inlet 140 and two outlets 142, 144. The outlets are controlled by means of the valves having knobs 146, 148. A tubing, 150 shown in dotted lines, would be connected to at least one if not both of the outlets. A removable cap member 152 is connected across another outlet 154 to further connect an additional gang valve in tandem with the first gang valve 90 shown. Air enters the inlet 140 and passes through a plenum chamber 160. From the plenum 160 the air can pass through any of the various outlets depending upon which are uncovered and which are opened by means of the valve controls.

It should be appreciated, that in addition to the particular type of accessory shown, other types of aquarium accessories could be secured in place by means of the same type of clamping arrangement. Likewise, other types of biting means could be utilized to penetrate or bite into the aquarium rim. The particular pins that have been shown, need not extend very far out of the device. In fact, a pin of the size of only one thousandth of an inch would be sufficient to provide adequate penetration and biting. Likewise, the individual projections need not be more than one thousandth of an inch above the grating surface. As long as there is some projection into the rim, it would be sufficient. Typically, the rims are formed of plastic or rubber material and even minimal projections would be sufficient to bite in and grasp the rim to secure the clamp in place.

There has been disclosed heretofore the best embodiment of the invention presently contemplated. However, it is to be understood that various changes and modifications may be made thereto without departing from the spirit of the invention.

What is claimed is:

1. An aquarium accessory for removable attachment to the top rim of an aquarium tank, comprising:
   an instrument;
   coupling means connected to the instrument, said coupling means comprising clamping means for securing to the rim, and means for biting into the rim upon securement by said clamping means, said clamping means and said biting means being applied to two opposite sides of said rim and acting on said rim in two opposite horizontal directions,
   said coupling means comprising an inverted U-shaped member having opposing walls and an interconnecting bridge, said clamping means associated with at least one of said walls, said biting means comprising a grating surface on one of said walls; and locking means for locking the grating surface on to said wall.

2. An aquarium accessory as in claim 1, wherein said clamping means comprises a clamp screw threaded through one of said walls.

3. An aquarium accessory as in claim 2, wherein said clamping screw and said biting means are coaxially positioned.

4. An aquarium accessory as in claim 1, wherein said rim comprises an edging for fitting onto the top of the walls of an aquarium tank, and having an inverted U-shaped cross sectional configuration, terminating in an inwardly directly ledge, and wherein the height of said walls is greater than a distance d measured from said ledge to a top of the edging.

5. An aquarium accessory as in claim 4, wherein said biting means is positioned from the bottom of the walls at least a distance less than the distance d.

6. An aquarium accessory as in claim 1, wherein said instrument comprises a heater for depending insertion from said rim into the aquarium tank.

7. An aquarium accessory as in claim 1, wherein said instrument is a gang valve for positioning onto said rim.

8. An aquarium accessory for removable attachment to the top rim of an aquarium tank, comprising:

an instrument; coupling means connected to the instrument, said coupling means comprising clamping means for securing to the rim, and means for biting into the rim upon securement by said clamping means, said coupling means comprising an inverted U-shaped member having opposing walls and an interconnecting bridge, said clamping means being associated with at least one of said walls and said biting means being associated with at least one of either said clamping means or a wall, said biting means comprising a grating surface on one of said walls; and locking means for locking the grating surface onto said wall, said locking means comprising side tabs on said grating surface, and channels in said walls for securely receiving said side tabs.

9. An aquarium accessory for removable attachment to the top rim of an aquarium tank, comprising:

an instrument, and coupling means connected to the instrument, said coupling means comprising clamping means for securing to the rim, and means for biting into the rim upon securement by said clamping means, said clamping means and said biting means being applied to two opposite sides of said rim and acting on said rim in two opposite horizontal directions, said coupling means comprising an inverted U-shaped member having opposing walls and an interconnecting bridge, said clamping means associated with at least one of said walls and said biting means associated with at least one of either said clamping means or a wall, wherein said biting means comprises a pin extending from one of said walls.

10. An aquarium accessory for removable attachment to the top rim of an aquarium tank, comprising:

an instrument; coupling means connected to the instrument, said coupling means comprising clamping means for securing to the rim, and means for biting into the rim upon securement by said clamping means, said coupling means comprising an inverted U-shaped member having opposing walls and an interconnecting bridge, said clamping means being associated with at least one of said walls and said biting means being associated with at least one of either said clamping means or a wall, said biting means comprising a grating surface on one of said walls; and locking means for locking the grating surface onto said wall, said locking means comprising a stud dependent from the bridge, and a gripping plate extending from said grating surface, said gripping plate securing onto said stud.

11. An aquarium accessory for removable attachment to the top rim of an aquarium tank, comprising:

an instrument;

and coupling means connected to the instrument, said coupling means comprising clamping means for securing to the rim and means for biting into the rim upon securement by said clamping means, said coupling means comprising an inverted U-shaped member having two opposite walls and an interconnecting bridge, said clamping means being associated with one of said walls, said biting means comprising a single pin extending from another of said walls.

* * * * *